Patented Aug. 26, 1941

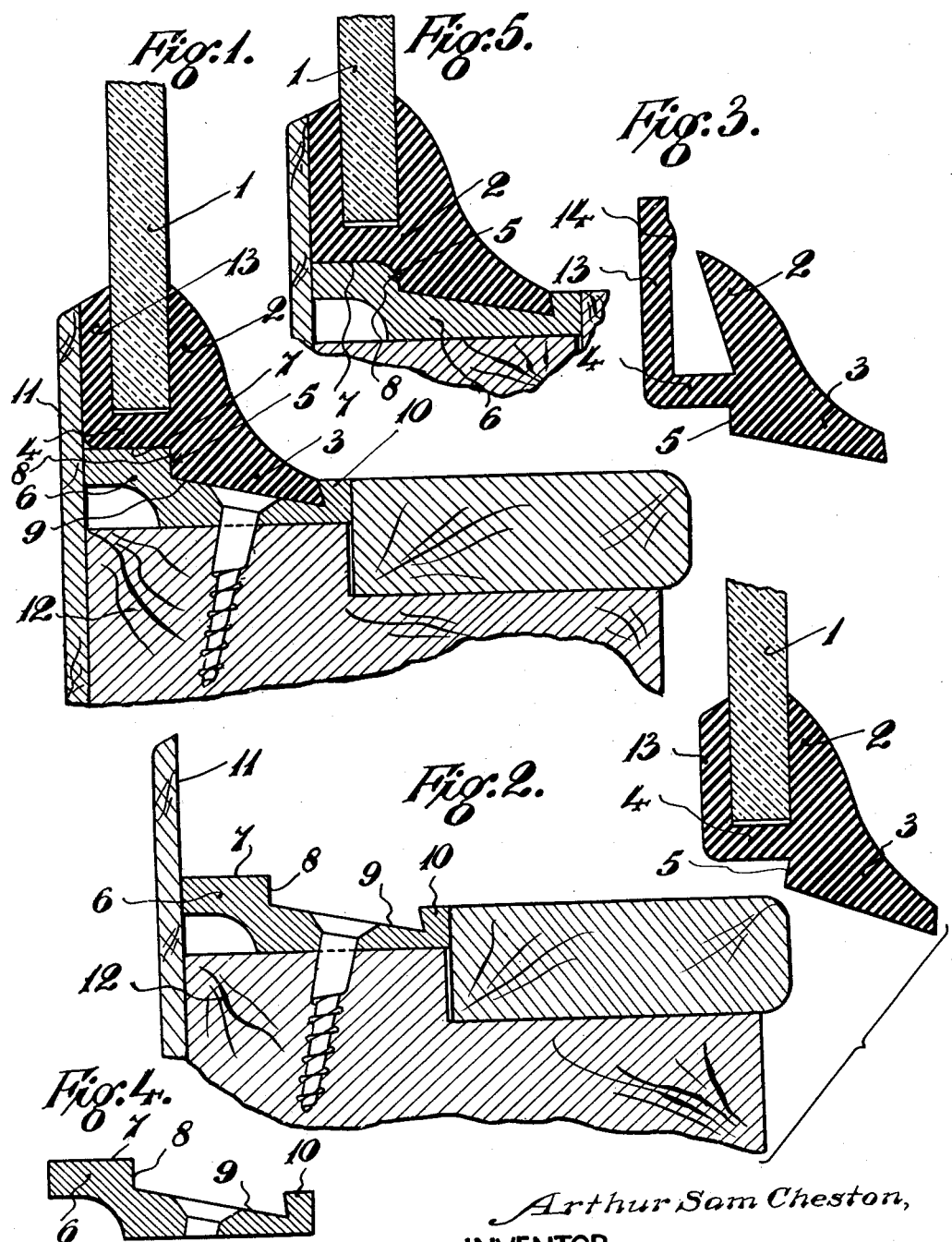

2,254,028

UNITED STATES PATENT OFFICE 2,254,028

MEANS FOR GLAZING WINDOWS

Arthur Sam Cheston, Birmingham, England, assignor of one-half to Herbert Linwood Sleigh, Birmingham, England Application October 6, 1938, Serial No. 233,526
In Great Britain June 3, 1938

1 Claim. (Cl. 20—56.4)

This invention relates to window glazing means of the kind described and claimed in specification No. 2,056,024, wherein a rubber or like resilient grooved strip or channel applied to the edge of the window panel has a flexible resilient and laterally-extending flap adapted, when the panel is inserted by a transverse movement into a frame bounding the window aperture to be engaged behind a lip or laterally compressed within a recess provided upon or in the said frame.

In the glazing means described in the said specification No. 2,056,024 the rear wall of the frame was provided with an overhanging lip or flange that engaged over the rear portion of the resilient strip to prevent the latter from rising in the event of the glass being cut too small so that it did not fit to the bottom of the groove or channel. It is not always convenient, however, to provide the frame with this overhanging lip or flange, but if it is omitted and the resilient strip has an unbroken or smooth under surface, the rear wall of the strip may, if the glass does not fit the bottom of the channel, tend to creep or ride up behind the glass when the panel and strip are being fitted to the window frame, especially when the resilient flap is being engaged with the frame lip or recess.

The principal object of the present invention, which is an improvement upon or a modification of the invention claimed in the said specification No. 2,056,024, is to provide alternative means for preventing the rear portion of the resilient strip or channel from riding up behind the glass should the latter not fit the bottom of the groove, thereby facilitating the fitting of the panel into the frame.

According to the invention, the resilient grooved strip or channel, having a laterally-extending flexible flap, is stepped or shouldered upon its underside to form a rearwardly-facing shoulder which is applied or is adapted to be applied against a complementary shoulder on the base of the frame. The engagement of these shoulders prevents the upward creeping or displacement of the rear portion of the strip. The said shoulder on the base of the strip may be approximately in the plane of the face of the panel which is nearest the flexible flap. The frame may comprise separate base members and rear walls, and the latter may be in the form of vertical plates attached to the structure in which the window aperture is formed.

Figure 1 of the accompanying drawing is a vertical section through glazing means according to the present invention as applied to a vehicle window.

Figure 2 is a section showing the window panel separated from the frame, said panel being fitted with the improved glazing strip.

Figure 3 is a section through the glazing strip in its initial condition, before being applied to the window panel.

Figure 4 is a section through the frame base member.

Figure 5 represents a modification.

Referring to the said drawing, which shows the invention as applied to the glazing of a vehicle window, the edge of the glass window panel 1 which is to be fitted in the window aperture, have grooved rubber strips or channels applied to them. Each of these strips is generally of the channel form shown in Figures 1 to 4 of specification No. 2,056,024, having a grooved body part 2 to receive the edge of the glass and a continuous front or outer flexible buttress flap 3 of substantially triangular section, this flap being integral with the front wall of the said body part and inclining downwards below the base 4 of the grooved body 2 at a suitable angle. Instead, however, of the underside of the strip being a continuous unbroken surface, it is stepped or shouldered to form a longitudinal normally rearwardly-facing shoulder 5 situated at right-angles to the horizontal under face of the body part 2 when the window is in place (Figure 1) and approximately in the vertical plane of the face of the panel 1 which is nearest the flexible flap 3; that is, in the plane of the inside surface of the channel wall that is integral with the said flap.

The fixed frame which receives the panel 1 comprises metal base strips or plates 6 screwed to the faces or sides of the parts of the wooden structure or vehicle body that bounds or forms the window aperture. These base strips 6 are extruded, cast or otherwise formed to a section which includes a flat horizontal top rear surface 7 situated under the channel or groove of the rubber strip, a normally forwardly-presented vertical shoulder 8 at the front edge of said rear portion (complementary in shape to said first mentioned shoulder 5) and a forward portion 9 that slopes or inclines downwardly from the base of the shoulder 8 and terminates in a shallow upstanding longitudinal lip 10 at the front edge. This lip, which may be slightly undercut on its rear wall, has its top face situated approximately level with or slightly below the bottom of the shoulder 8 and it forms, with the inclined surface 9, a shallow sloping recess. The frame is completed by a separate flat vertical back plate or rear wall member 11 secured to the face of the vehicle body 12, adjacent the window aperture, so as to project to a suitable height above the base strip 6.

To fit the window panel in the aperture, the rubber strips are applied to the edges of the panel 1 as shown in Figure 2, and the latter is inserted into the aperture by a movement which is transverse to its own plane. Thus, the rubber strips are pushed over the frame base parts 6 until the shoulders 5 on the said rubber strips engage with the opposed shoulders 8 on the frame, the rear wall 13 of the rubber parts coming against the rear wall 11 of the frame. During this operation, the front flaps 3 of the rubber strips are flexed upwardly by engagement with the frame and finally are sprung or forced over and behind the upstanding front lip 10 of the frame, as shown in Figure 1, so as to fit snugly with lateral compression within the sloping recess in the latter.

Owing to the engagement of the shoulder 5 on the rubber strip with the shoulder 8 on the frame, the rear portion of the rubber, during the fitting of the panel, is positively prevented from rising behind the glass should the latter be cut on the small side so as not to fit to the bottom of the groove in the strip.

The rubber strip and frame may be arranged so that the flexible buttress flap of the said strip is situated either at the inside or the outside of the window.

Initially the rubber strip may have the form shown in Figure 3, the rear wall 13 being extended above the front wall and having a rib 14 on its inner face which, when the glass is fitted, is more or less flattened out, giving a firm pressure on the face of the glass. When the panel is fitted to the frame the upper part of wall 13 is trimmed off flush with the top of plate 11.

According to the modification shown in Figure 5, the shoulder 8 of the base plate 6 has a rounded upper corner and the shoulder 5 on the underside of the rubber strip 2 is rounded to correspond, as shown in the drawing. This construction will facilitate the positioning of the rubber strip upon the top rear surface 7 of the base plate.

Having fully described my invention, what I desire to claim and secure by Letters Patent is:

Window glazing means, comprising a laterally one-piece compressible strip having a channeled body portion, adapted to receive an edge of a window panel, and a laterally and diagonally downwardly extending flexible flap, said strip having an abrupt shoulder upon its under side substantially beneath the forward wall of said panel-receiving channel and facing away from said flap, in combination with a frame having a recess to receive and laterally compress said strip, said recess being defined laterally between an upstanding wall and an undercut lip, and also provided with a shoulder complementary to said strip shoulder, the lowermost part of said recess being adjacent to said lip and below the level of the base of said recess shoulder.

ARTHUR SAM CHESTON.